United States Patent
Liu (10) Patent No.: US 10,149,234 B2
(45) Date of Patent: *Dec. 4, 2018

(54) NETWORK ACCESS METHOD AND MOBILE COMMUNICATION TERMINAL

(71) Applicant: GUANGDONG OPPO MOBILE TELECOMMUNICATIONS CORP., LTD., Dongguan (CN)

(72) Inventor: Hai Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/514,829

(22) PCT Filed: Mar. 31, 2016

(86) PCT No.: PCT/CN2016/078082
§ 371 (c)(1),
(2) Date: Mar. 28, 2017

(87) PCT Pub. No.: WO2016/173375
PCT Pub. Date: Nov. 3, 2016

(65) Prior Publication Data
US 2017/0223620 A1    Aug. 3, 2017

(30) Foreign Application Priority Data

Apr. 30, 2015 (CN) .......................... 2015 1 0218554

(51) Int. Cl.
*H04W 48/16* (2009.01)
*H04W 48/14* (2009.01)
(Continued)

(52) U.S. Cl.
CPC .......... *H04W 48/16* (2013.01); *H04W 8/082* (2013.01); *H04W 8/30* (2013.01); *H04W 48/14* (2013.01);
(Continued)

(58) Field of Classification Search
CPC ..... H04W 48/14; H04W 48/16; H04W 48/18; H04W 8/082; H04W 8/30; H04W 84/042
See application file for complete search history.

(56) References Cited

U.S. PATENT DOCUMENTS

2006/0211420 A1    9/2006  Ophir
2012/0064883 A1    3/2012  Kim
(Continued)

FOREIGN PATENT DOCUMENTS

CN    101400097 A    4/2009
CN    102196531 A    9/2011
(Continued)

OTHER PUBLICATIONS

Huawei; Hisilicon, The MDT applicability of Equivalent PLMN identities, Aug. 26, 2011, 3GPP TSG-RAN WG3 Meeting #73,R3-111912.
(Continued)

*Primary Examiner* — Wayne H Cai
(74) *Attorney, Agent, or Firm* — Ladas & Parry LLP (57) ABSTRACT

An embodiment of the present disclosure provides a network access method, including transmitting a request for acquiring shared network information to a shared server if a mobile communication terminal detects that a network identification of a PLMN of a visited place does not exist in a local memory of the mobile communication terminal; receiving the shared network information which the shared server transmits in response to the request, and acquiring the network identification of the PLMN of the visited place from
(Continued)

the shared network information; adding the network identification of the PLMN of the visited place to an EPLMN list by the mobile communication terminal; and accessing a network according to the EPLMN list.

15 Claims, 8 Drawing Sheets

(51) Int. Cl.
*H04W 48/18* (2009.01)
*H04W 8/08* (2009.01)
*H04W 8/30* (2009.01)
*H04W 84/04* (2009.01)

(52) U.S. Cl.
CPC ......... *H04W 48/18* (2013.01); *H04W 84/042* (2013.01)

(56) References Cited

U.S. PATENT DOCUMENTS

| | | |
|---|---|---|
| 2012/0282924 A1 | 11/2012 | Tagg |
| 2013/0109377 A1 | 5/2013 | Al-Khudairi et al. |
| 2014/0031033 A1 | 1/2014 | Juang et al. |
| 2014/0031035 A1* | 1/2014 | Tagg .................... H04W 60/06 455/433 |
| 2014/0051423 A1 | 2/2014 | Marsden et al. |
| 2014/0235241 A1* | 8/2014 | Sharan .................. H04W 60/04 455/435.2 |
| 2014/0274038 A1 | 9/2014 | Singhal et al. |
| 2015/0163698 A1* | 6/2015 | Jokinen ............ H04W 36/0061 455/436 |
| 2015/0319602 A1 | 11/2015 | Tagg et al. |
| 2017/0150435 A1 | 5/2017 | Tagg et al. |
| 2017/0215134 A1 | 7/2017 | Liu |

FOREIGN PATENT DOCUMENTS

| | | |
|---|---|---|
| CN | 103188638 A | 7/2013 |
| CN | 103313227 A | 9/2013 |
| CN | 104853345 A | 8/2015 |
| CN | 104853413 A | 8/2015 |
| CN | 104902459 A | 9/2015 |
| EP | 1703752 A2 | 9/2006 |
| EP | 2429224 A1 | 3/2012 |
| WO | 2013067014 A1 | 5/2013 |

OTHER PUBLICATIONS

International Search Report in international application No. PCT/CN2016/078082, dated Jun. 28, 2016.
English Translation of the Written Opinion of the International Search Authority in international application No. PCT/CN2016/078082, dated Jun. 28, 2016.
Supplementary European Search Report in European application No. 16785806.7, dated Aug. 30, 2017.

* cited by examiner

NETWORK ACCESS METHOD AND MOBILE COMMUNICATION TERMINAL

CROSS REFERENCE TO RELATED APPLICATIONS

This application claims the priority of International Application No. PCT/CN2016/078082, filed Mar. 31, 2016, which claims the priority of Chinese Application No. 201510218554.3 filed Apr. 30, 2015 and titled "Network Access Method and Mobile Communication Terminal". The entire disclosures of the above applications are incorporated herein by reference.

BACKGROUND

Field

The present disclosure relates to a mobile terminal technology field, and more particularly to network access method and a mobile communication terminal.

Background

A public land mobile network (PLMN) is a network, which is established and operated by a government or an operator authorized by the government, for a purpose of providing land mobile communication services for the public. The network is usually interconnected with public switched telephone networks to establish a communication network in a region or a country.

Identification of a PLMN usually includes a series of digital codes. For instance, a network identification of a PLMN of the CHINA MOBILE is 46000, and a network identification of a PLMN of the CHINA UNICOM is 46001. Users can have convenient communications via mobile networks provided by operators. With the improvement of people's living, users travel or go on a business trip abroad with mobile communication terminals are more and more. When the users carry on roaming communications (e.g., international roaming communications), their mobile communication terminals (e.g., mobile phones) need to re-find networks to acquire a network identification of a PLMN.

When a mobile communication terminal is moved from a home place to a visited place (e.g., the mobile communication terminal roams from a home country to a visited country), the mobile communication terminal requires accessing to a PLMN of the current visited place. However, when the mobile communication terminal is moved from the home place to the visited place, a situation that the mobile communication terminal takes a long time (sometimes needs to wait for tens of minutes) to successfully access to the PLMN of the currently visited place often occurs. This significantly affects the user's communication experiences.

SUMMARY OF THE DISCLOSURE

Embodiments of the present disclosure are to provide a network access method to solve the technical problem in the prior art. Before a mobile communication terminal is turned off or enters an airplane mode, a user can download shared network information in a shared server according to information of a visited place via a network, acquire a visited public land mobile network (PLMN), and add the VPLMN to an EPLMN list. When the mobile communication terminal performs a network searching in a visited place by using a registered public land mobile network (RPLMN), because the searched RPLMN is equivalent to the VPLMN, the mobile communication terminal can reside in the cell site and try to initiate a network registration process, thereby accelerating speed of the network searching.

To solve the above problem, in a first aspect in accordance with an embodiment of the present disclosure, a network access method is provided, including:

Transmitting a request for acquiring shared network information to a shared server if a mobile communication terminal detects that a network identification of a public land mobile network (PLMN) of a visited place does not exist in a local memory of the mobile communication terminal, wherein the network identification of the PLMN of the visited place is a network identification of an operator of the visited place, which signs a roaming agreement with an operator of a home place to which a subscriber identity module attached to the mobile communication terminal belongs, and the shared network information includes the network identification of the PLMN of the visited place which a second terminal pushes to the shared server;

Receiving the shared network information which the shared server transmits in response to the request, and acquiring the network identification of the PLMN of the visited place from the shared network information;

Adding the network identification of the PLMN of the visited place to an equivalent PLMN (EPLMN) list by the mobile communication terminal, wherein the EPLMN list includes a network identification of a PLMN of the home place and the network identification of the PLMN of the visited place; and Accessing a network according to the EPLMN list.

In a second aspect in accordance with an embodiment of the present disclosure, a mobile communication terminal is provided, including:

A memory configured to store computer readable program codes; and

A processor configured to execute the computer readable program codes to perform the following operations:

Transmitting a request for acquiring shared network information to a shared server if the mobile communication terminal detects that a network identification of a public land mobile network (PLMN) of a visited place does not exist in a local memory of the mobile communication terminal, wherein the network identification of the PLMN of the visited place is a network identification of an operator of the visited place, which signs a roaming agreement with an operator of a home place to which a subscriber identity module attached to the mobile communication terminal belongs, and the shared network information includes the network identification of the PLMN of the visited place which a second terminal pushes to the shared server;

Receiving the shared network information which the shared server transmits in response to the request, and acquiring the network identification of the PLMN of the visited place from the shared network information;

Adding the network identification of the PLMN of the visited place to an equivalent PLMN (EPLMN) list by the mobile communication terminal, wherein the EPLMN list includes a network identification of a PLMN of the home place and the network identification of the PLMN of the visited place; and Accessing a network according to the EPLMN list.

In an embodiment of the present disclosure, a computer readable storage medium stored with computer readable program codes is provided, and the computer readable program codes are operated in a mobile communication terminal for:

Transmitting a request for acquiring shared network information to a shared server if the mobile communication terminal detects that a network identification of a public land mobile network (PLMN) of a visited place does not exist in a local memory of the mobile communication terminal, wherein the network identification of the PLMN of the visited place is a network identification of an operator of the visited place, which signs a roaming agreement with an operator of a home place to which a subscriber identity module attached to the mobile communication terminal belongs, and the shared network information includes the network identification of the PLMN of the visited place which a second terminal pushes to the shared server;

Receiving the shared network information which the shared server transmits in response to the request, and acquiring the network identification of the PLMN of the visited place from the shared network information;

Adding the network identification of the PLMN of the visited place to an equivalent PLMN (EPLMN) list by the mobile communication terminal, wherein the EPLMN list includes a network identification of a PLMN of the home place and the network identification of the PLMN of the visited place; and Accessing a network according to the EPLMN list.

In the technical schemes in accordance with the embodiments of the present disclosure, not only a network identification of a home PLMN of the mobile communication terminal but also an acquired network identification of a PLMN of an operator, which signs a roaming agreement with an operator of the home PLMN, is added to the EPLMN list. The PLMNs in the ELPMN list in which the network identifications are stored are regarded to be equivalent. As a result, a network of the mobile communication terminal can be accessed according to the EPLMN list because the network identifications of the PLMNs of operators of the visited places, which sign a roaming agreement with the operator of the home PLMN, are stored in the EPLMN list. Accordingly, when the mobile communication terminal is moved from a home place to a visited place and performs a network searching, possibility of matching with any one of the PLMNs in the EPLMN list storing the network identifications is significantly increased during the network searching. A success rate and speed can be increased when the mobile communication terminal is accessed to the network of the visited place. This is beneficial to shorten a user's waiting time significantly (in an ideal state, the mobile communication terminal may be accessed to the network within several seconds), thereby enhancing the user's communication experiences.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and those skilled in the art may still derive other drawings from these accompanying drawings without creative efforts.

DETAILED DESCRIPTION OF THE PREFERRED EMBODIMENTS

A clear and complete description of technical solutions provided in the embodiments of the present disclosure will be given below, in conjunction with the accompanying drawings in the embodiments of the present disclosure. Apparently, the embodiments described below are merely a part, but not all, of the embodiments of the present disclosure. All of other embodiments, obtained by those skilled in the art based on the embodiments of the present disclosure without any inventive efforts, fall into the protection scope of the present disclosure.

It is noted that the terms used in the embodiments of the present disclosure are merely for the purpose of illustrating specific embodiments, and are not intended to limit the present disclosure. The terms "a", "said" and "the" of singular forms used in the embodiments and the appended claims of the present disclosure are also intended to include plural forms, unless otherwise specified in the context clearly. It should also be understood that, the term "and/or" used herein indicates and includes any or all possible combinations of one or more associated listed items.

A public land mobile network (PLMN) is a network which is established and operated, by a government or an operator authorized by the government, for a purpose of providing land mobile communication services for the public. The network is usually interconnected with public switched telephone networks (PSTNs) to establish a communication network in a region or a country. PLMN=MCC+MNC. For instance, network identifications of PLMNs of the CHINE MOBILE include 46000, 46002, 46007, and 46008. Network identifications of PLMNs of the CHINE UNICOM include 46004, 46006, and 46009. A PLMN is a wireless communication system, which is oriented toward the land, e.g., users in transportation or in moving. However, users of mobile and portable internet are more and more. An ideal PLMN system provides the users of mobile and portable internet with the same services as a fixed network. This is a particular challenge in a complicated topographic region because a base station is difficult to be found and maintained. There are a lot of obstacles in the urban environment, such as buildings, and various types of radio frequency will cause radiation of noises and interferences.

A registered PLMN (RPLMN) is a PLMN which is registered before a mobile communication terminal is turned off or out of service. In the TSG TP-21 meeting in 2003, this parameter is decided to be deleted from a USIM and stored in a memory of the terminal.

An equivalent PLMN (EPLMN) is a PLMN which has status and priority equivalent to those of a current PLMN selected by the mobile communication terminal.

An equivalent home PLMN (EHPLMN) is a local PLMN which has status and priority equivalent to those of the current PLMN selected by the mobile communication terminal. Specifically, each of the EHPLMN and the EPLMN is such as a 158 network which is newly established by the CHINA MOBILE. The PLMN is such as one of existing 135~139 networks.

A home PLMN (HPLMN) is a home PLMN of a user of the mobile communication terminal. That is, MCC and MNC included in an IMSI of a USIM card of the mobile communication terminal are identical to MCC and MNC of the HPLMN. A user has only one home PLMN.

A visited PLMN (VPLMN) is a PLMN of a place which is visited by the user of the mobile communication terminal. MCC and MNC of the VPLMN are not identical to MCC and MNC stored in an IMSI of a SIM card. When the mobile communication terminal loses its coverage, a VPLMN is selected.

Figure 1:
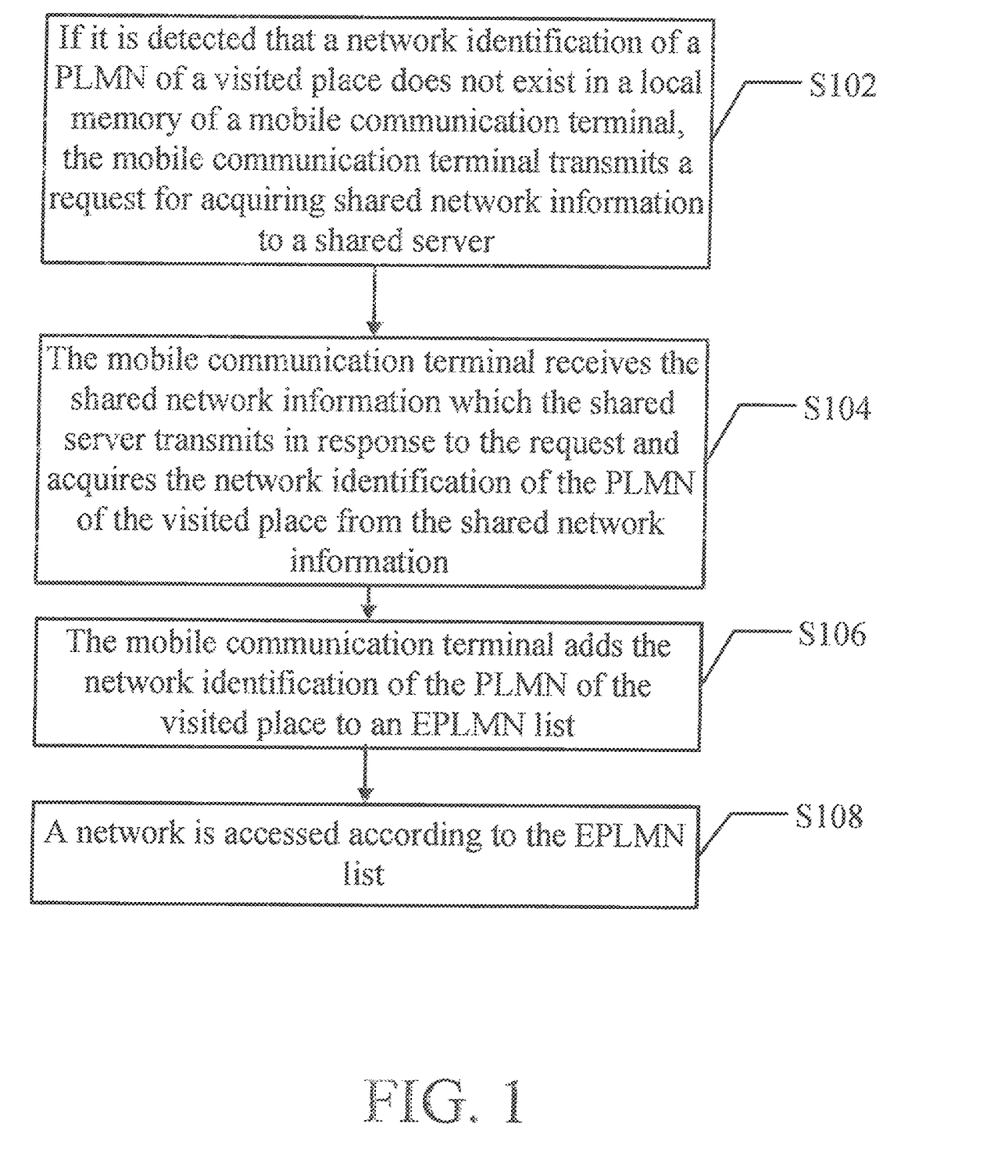
FIG. 1 is a schematic flowchart of an implementation manner of a network access method provided by an embodiment of the present disclosure.

Please refer to FIG. 1, which is a schematic flowchart of an implementation manner of a network access method provided by an embodiment of the present disclosure. The method includes the following steps.

In step S102, if it is detected that a network identification of a PLMN of a visited place does not exist in a local memory of a mobile communication terminal, the mobile communication terminal transmits a request for acquiring shared network information to a shared server. The network identification of the PLMN of the visited place is a network identification of an operator of the visited place, which signs a roaming agreement with an operator of a home place to which a subscriber identity module (SIM card) attached to the mobile communication terminal belongs.

Specifically, the mobile communication terminal may be a mobile phone. When the user travels or goes on a business trip abroad with the mobile communication terminal, a network of the mobile communication terminal enters an international roaming period. The visited place and the home place belong to different countries. The home place may be China, and the visited place may be, e.g., America or Korea. For instance, when the user travels with the mobile phone from China to America, the home place is China and the visited place is America. The network of the mobile phone is in an international roaming period. If the mobile communication terminal detects that the network identification of the PLMN of the visited place does not exist in the local memory of the mobile communication terminal, the mobile communication terminal can transmit the request for acquiring the shared network information to the shared server before reaching the visited place. The network identification of the PLMN of the visited place is the network identification of the operator of the visited place, which signs the roaming agreement with the operator of the home place to which the subscriber identity module (SIM card) attached to the mobile communication terminal belongs. In the embodiment of the present disclosure, the network identification may include a network number. For instance, the CHINA MOBILE includes four network numbers: 46000, 46002, 46007, and 46008. The CHINA UNICOM includes three network numbers: 46001, 46006, and 46009.

In step S104, the mobile communication terminal receives the shared network information which the shared server transmits in response to the request and acquires the network identification of the PLMN of the visited place from the shared network information.

Specifically, the mobile communication terminal can receive the shared network information which the shared server transmits the request and acquire the network identification of the PLMN of the visited place from the shared network information. The mobile communication terminal can receive all of the shared network information which the shared server transmits. Alternatively, the mobile communication terminal can receive the shared network information with respect to the visited place which the shared server transmits. The shared network information may include but not limited to HPLMN, EPLMN, and VPLMN.

For instance, when the user travels with the mobile phone from China to America, the home place is China and the visited place is America. The mobile phone can receive all of the shared network information which the shared server transmits. Alternatively, the mobile phone can download all of the shared network information from the shared server and store the same in the memory of the mobile phone. Alternatively, the mobile phone can receive the shared network information with respect to America which the shared server transmits. Alternatively, the mobile phone can download the shared network information with respect to America from the shared server and store the same in the memory of the mobile phone.

In step S106, the mobile communication terminal adds the network identification of the PLMN of the visited place to an EPLMN list. The EPLMN list includes the network identification of the PLMN of the home place and the network identification of the PLMN of the visited place.

Figure 2:
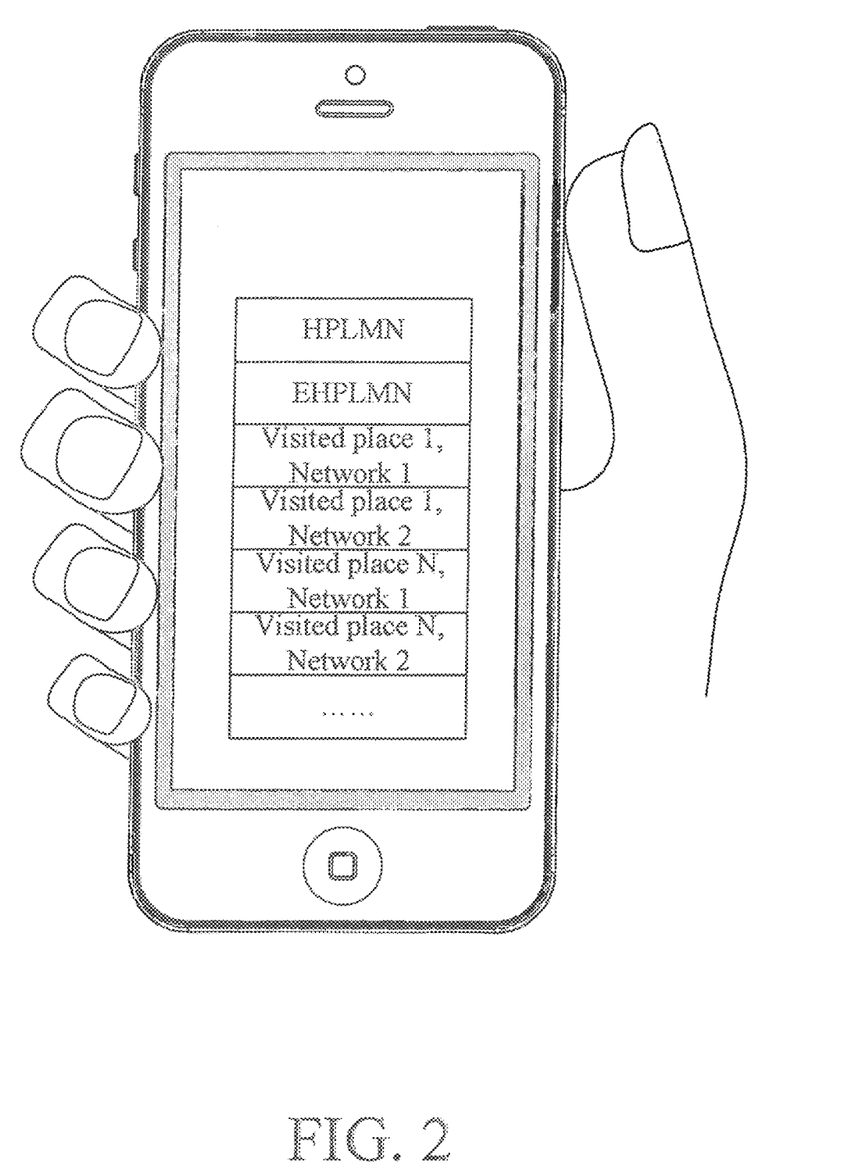
FIG. 2 is a schematic diagram of an implementation manner of an EPLMN list provided by an embodiment of the present disclosure.

Specifically, the network identification of the PLMN of the visited place received in step S104 may be added to the EPLMN list. A schematic diagram of the EPLMN list is shown in FIG. 2. The EPLMN is a PLMN which has status and priority equivalent to those of the current PLMN selected by the user of the terminal. The EPLMN mainly solves problems of user residence and roaming strategy between a shared network and an original network. An operator can configure equivalent PLMNs. These networks can implement to share resources of communication networks. From the point of business, the resources of the communication networks can be shared between different operators or different PLMNs defined by the same operator. In the embodiment of the present disclosure, the network identification may include a network number. For instance, the CHINA MOBILE includes four network numbers: 46000, 46002, 46007, and 46008. The CHINA UNICOM includes three network numbers: 46001, 46006, and 46009. The network list may include the network identification of the PLMN of the home place and the network identification of the PLMN of the visited place added in advance. Alternatively, the network list may include the network identification of the equivalent home PLMN and the network identification of the PLMN of the visited place added in advance. Alternatively, the network list may include the network identification of the PLMN of the home place, the network identification of the equivalent PLMN, and the network identification of the PLMN of the visited place added in advance. The network identification of the PLMN of the visited place added in advance is equivalent to and has priority the same as an RPLMN which is registered before the terminal is turned off or out of service.

In step S108, a network is accessed according to the EPLMN list.

Specifically, when being moved from the home place to the visited place, the mobile communication terminal can receive a turn-on instruction from the user or an instruction of closing a current airplane mode. After being turned on or closing the current airplane mode, the mobile communication terminal starts a network searching. The mobile communication terminal may carry on the network searching according to the network identification in the EPLMN list. The mobile communication terminal scans the network identification of the PLMN of the visited place which can acquire broadcast from a base station. The mobile communication terminal can match the network identification of the PLMN acquired from the above-mentioned scanning with the network identification of the PLMN in the EPLMN list.

When the searching of the mobile communication terminal shows that the network identification of the PLMN of the visited place transmitted by a cell site matches with any one of the network identification in the EPLMN list, the mobile communication terminal may initiate a network registration and establish a communication connection with the network of the visited place.

Figure 3:
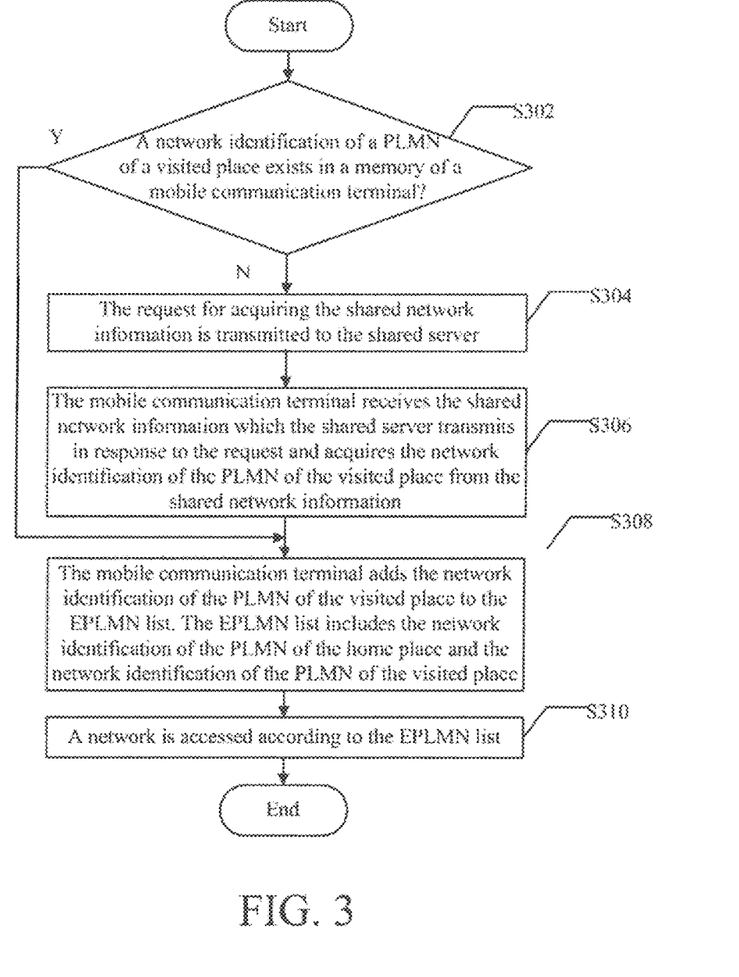
FIG. 3 is a schematic flowchart of another implementation manner of a network access method provided by an embodiment of the present disclosure.

Please refer to FIG. 3, which is a schematic flowchart of another implementation manner of a network access method provided by an embodiment of the present disclosure. The method includes the following steps.

In step S302, it is determined whether a network identification of a PLMN of a visited place exists in a memory of a mobile communication terminal.

Specifically, the mobile communication terminal may be a mobile phone. When the user travels or goes on a business trip abroad with the mobile communication terminal, the mobile communication terminal enters an international roaming period. The visited place and a home place belong to different countries. The home place may be China, and the visited place may be, e.g., America or Korea. For instance, when the user travels with the mobile phone from China to America, the home place is China and the visited place is America. A network of the mobile phone is in an international roaming period. Before reaching the visited place, the mobile communication terminal can determine whether the network identification of the PLMN of the visited place exists in the local memory of the mobile communication terminal. The network identification of the PLMN of the visited place is a network identification of an operator of the visited place, which signs a roaming agreement with an operator of the home place to which a SIM card attached to the mobile communication terminal belongs. In the embodiment of the present disclosure, the network identification may include a network number. For instance, the CHINA MOBILE includes four network numbers: 46000, 46002, 46007, and 46008. The CHINA UNICOM includes three network numbers: 46001, 46006, and 46009.

If a determined result is no, step S304 is triggered to perform transmitting a request for acquiring shared network information to a shared server. If the determined result is yes, step S308 is triggered to perform adding the network identification of the PLMN of the visited place to an EPLMN list.

In step S304, the request for acquiring the shared network information is transmitted to the shared server.

Specifically, if the determined result in step S302 is no, the mobile communication terminal may transmit the request for acquiring the shared network information to the shared server. For instance, the mobile phone can transmit the request to the shared server to request acquiring the shared network information stored in the shared server.

In step S306, the mobile communication terminal receives the shared network information which the shared server transmits in response to the request and acquires the network identification of the PLMN of the visited place from the shared network information.

Specifically, the mobile communication terminal can receive the shared network information which the shared server transmits in response to the request and acquires the network identification of the PLMN of the visited place from the shared network information. The shared network information may include but not limited to HPLMN, EPLMN, and VPLMN. The mobile communication terminal can receive all of the shared network information which the shared server transmits. Alternatively, the mobile communication terminal can receive the shared network information with respect to the visited place which the shared server transmits.

For instance, when the user travels with the mobile phone from China to America, the home place is China and the visited place is America. The mobile phone can receive all of the shared network information which the shared server transmits. Alternatively, the mobile phone can download all of the shared network information from the shared server and store the same in the memory of the mobile phone. Alternatively, the mobile phone can receive the shared network information with respect to America which the shared server transmits. Alternatively, the mobile phone can download the shared network information with respect to America from the shared server and store the same in the memory of the mobile phone.

In step S308, the mobile communication terminal adds the network identification of the PLMN of the visited place to the EPLMN list. The EPLMN list includes the network identification of the PLMN of the home place and the network identification of the PLMN of the visited place.

Specifically, the network identification of the PLMN of the visited place received in step S306 may be added to the EPLMN list. A schematic diagram of the EPLMN list is shown in FIG. 2. The EPLMN is a PLMN which has status and priority equivalent to those of the current PLMN selected by the user of the terminal. The EPLMN mainly solves problems of user residence and roaming strategy between a shared network and an original network. An operator can configure equivalent PLMNs. These networks can implement to share resources of communication networks. From the point of business, the resources of the communication networks can be shared between different operators or different PLMNs defined by the same operator. In the embodiment of the present disclosure, the network identification may include a network number. For instance, the CHINA MOBILE includes four network numbers: 46000, 46002, 46007, and 46008. The CHINA UNICOM includes three network numbers: 46001, 46006, and 46009. The network list may include the network identification of the PLMN of the home place and the network identification of the PLMN of the visited place added in advance. Alternatively, the network list may include the network identification of the equivalent home PLMN and the network identification of the PLMN of the visited place added in advance. Alternatively, the network list may include the network identification of the PLMN of the home place, the network identification of the equivalent home PLMN, and the network identification of the PLMN of the visited place added in advance. The network identification of the PLMN of the visited place added in advance is equivalent to and has priority the same as an RPLMN which is registered before the terminal is turned off or out of service.

In step S310, a network is accessed according to the EPLMN list.

Specifically, when being moved from the home place to the visited place, the mobile communication terminal can receive a turn-on instruction from the user or an instruction of closing a current airplane mode. After being turned on or closing the current airplane mode, the mobile communication terminal starts a network searching. The mobile communication terminal may carry on the network searching according to the network identification in the EPLMN list. The mobile communication terminal scans the network identification of the PLMN of the visited place which can acquire broadcast from a base station. The mobile communication terminal can match the network identification of the PLMN acquired from the above-mentioned scanning with the network identification of the PLMN in the EPLMN list.

When the searching of the mobile communication terminal shows that the network identification of the PLMN of the visited place transmitted by a cell site matches with any one of the network identification in the EPLMN list, the mobile communication terminal may initiate a network registration and establish a communication connection with the network of the visited place.

Figure 4:
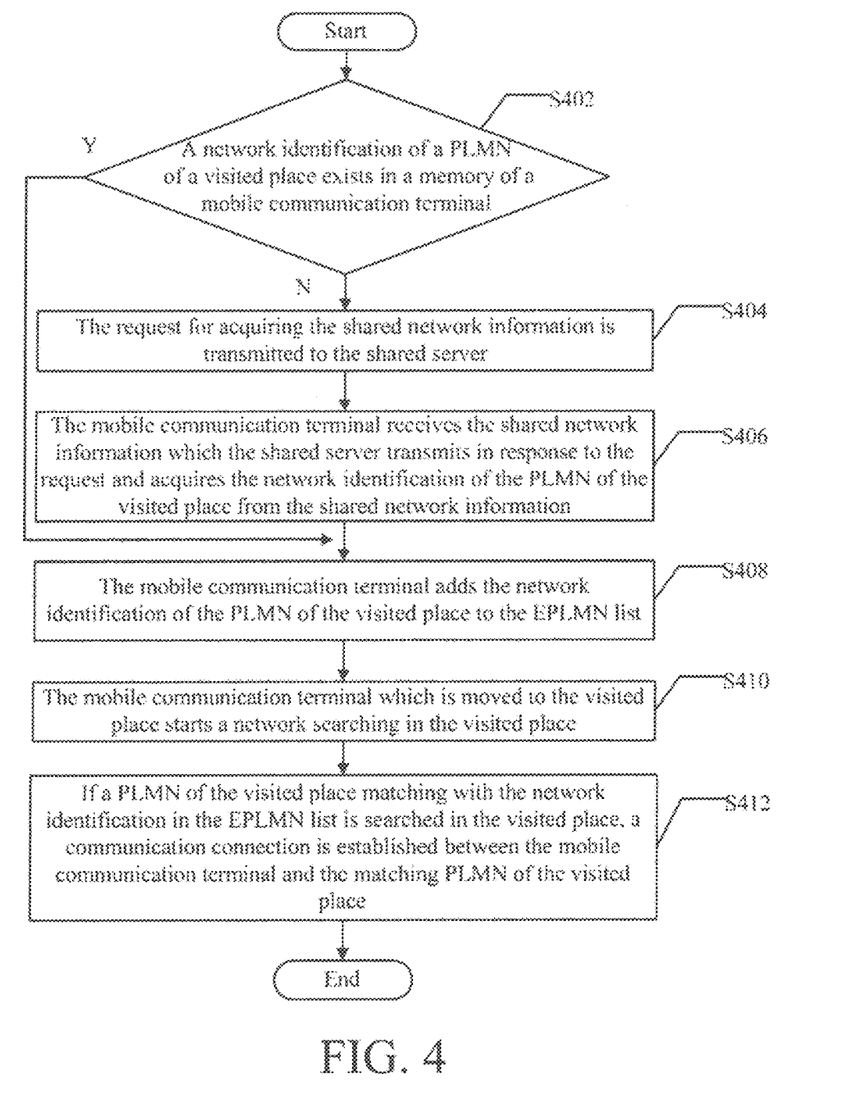
FIG. 4 is a schematic flowchart of yet another implementation manner of a network access method provided by an embodiment of the present disclosure.

Please refer to FIG. 4, which is a schematic flowchart of yet another implementation manner of a network access method provided by an embodiment of the present disclosure. The method includes the following steps.

In step S402, it is determined whether a network identification of a PLMN of a visited place exists in a memory of a mobile communication terminal.

Specifically, the mobile communication terminal may be a mobile phone. When the user travels or goes on a business trip abroad with the mobile communication terminal, the mobile communication terminal enters an international roaming period. The visited place and a home place belong to different countries. The home place may be China, and the visited place may be, e.g., America or Korea. For instance, when the user travels with the mobile phone from China to America, the home place is China and the visited place is America. A network of the mobile phone is in an international roaming period. Before reaching the visited place, the mobile communication terminal can determine whether the network identification of the PLMN of the visited place exists in the local memory of the mobile communication terminal. The network identification of the PLMN of the visited place is the network identification of an operator of the visited place, which signs a roaming agreement with an operator of the home place to which a SIM card attached to the mobile communication terminal belongs. In the embodiment of the present disclosure, the network identification may include a network number. For instance, the CHINA MOBILE includes four network numbers: 46000, 46002, 46007, and 46008. The CHINA UNICOM includes three network numbers: 46001, 46006, and 46009.

If a determined result is no, step S404 is triggered to perform transmitting a request for acquiring shared network information to a shared server. If the determined result is yes, step S408 is triggered to perform adding the network identification of the PLMN of the visited place to an EPLMN list.

In step S404, the request for acquiring the shared network information is transmitted to the shared server.

Specifically, if the determined result in step S402 is no, the mobile communication terminal may transmit the request for acquiring the shared network information to the shared server. For instance, the mobile phone can transmit the request to the shared server to request acquiring the shared network information stored in the shared server.

In step S406, the mobile communication terminal receives the shared network information which the shared server transmits in response to the request and acquires the network identification of the PLMN of the visited place from the shared network information.

Specifically, the mobile communication terminal can receive the shared network information which the shared server transmits in response to the request and acquires the network identification of the PLMN of the visited place from the shared network information. The shared network information may include but not limited to HPLMN, EPLMN, and VPLMN. The mobile communication terminal can receive all of the shared network information which the shared server transmits. Alternatively, the mobile communication terminal can receive the shared network information with respect to the visited place which the shared server transmits.

For instance, when the user travels with the mobile phone from China to America, the home place is China and the visited place is America. The mobile phone can receive all of the shared network information which the shared server transmits. Alternatively, the mobile phone can download all of the shared network information from the shared server and store the same in the memory of the mobile phone. Alternatively, the mobile phone can receive the shared network information with respect to America which the shared server transmits. Alternatively, the mobile phone can download the shared network information with respect to America from the shared server and store the same in the memory of the mobile phone.

In step S408, the mobile communication terminal adds the network identification of the PLMN of the visited place to the EPLMN list. The EPLMN list includes the network identification of the PLMN of the home place and the network identification of the PLMN of the visited place.

Specifically, the network identification of the PLMN of the visited place received in step S406 may be added to the EPLMN list. A schematic diagram of the EPLMN list is shown in FIG. 2. The EPLMN is a PLMN which has status and priority equivalent to those of the current PLMN selected by the user of the terminal. The EPLMN mainly solves problems of user residence and roaming strategy between a shared network and an original network. An operator can configure equivalent PLMNs. These networks can implement to share resources of communication networks. From the point of business, the resources of the communication networks can be shared between different operators or different PLMNs defined by the same operator. In the embodiment of the present disclosure, the network identification may include a network number. For instance, the CHINA MOBILE includes four network numbers: 46000, 46002, 46007, and 46008. The CHINA UNICOM includes three network numbers: 46001, 46006, and 46009. The network list may include the network identification of the PLMN of the home place and the network identification of the PLMN of the visited place added in advance. Alternatively, the network list may include the network identification of the equivalent home PLMN and the network identification of the PLMN of the visited place added in advance. Alternatively, the network list may include the network identification of the PLMN of the home place, the network identification of the equivalent home PLMN, and the network identification of the PLMN of the visited place added in advance. The network identification of the PLMN of the visited place added in advance is equivalent to and has priority the same as an RPLMN which is registered before the terminal is turned off or out of service.

In step S410, the mobile communication terminal which is moved to the visited place starts a network searching in the visited place.

Specifically, the mobile communication terminal may be a mobile phone. When the user travels or goes on a business trip abroad with the mobile communication terminal, the mobile communication terminal enters an international roaming period. When being moved to the visited place, the mobile communication terminal can perform the network searching in the visited place.

For instance, when the user travels from the home place China to the visited place America with the mobile phone and turns on the mobile phone first time, the network searching of the mobile phone can be performed in America.

In step S412, if a PLMN of the visited place matching with the network identification in the EPLMN list is searched in the visited place, a communication connection is established between the mobile communication terminal and the matching PLMN of the visited place.

Specifically, when being moved to the visited place, the mobile communication terminal can receive a turn-on instruction from the user or an instruction of closing a current airplane mode. After being turned on or closing the current airplane mode, the mobile communication terminal starts a network searching. The mobile communication terminal may carry on the network searching according to the network identification in the network list. The mobile communication terminal scans the network identification of the PLMN of the visited place which can acquire broadcast from a base station. The mobile communication terminal can match the network identification of the PLMN acquired from the above-mentioned scanning with the network identification of the PLMN in the EPLMN list. If the PLMN of the visited place matching with the network identification in the EPLMN list is searched in the visited place, the communication connection is established between the mobile communication terminal and the matching PLMN of the visited place.

Further, the mobile phone can read the stored network list and acquire the network identification of the PLMN of the visited place in the network list. When the searching of the mobile communication terminal shows that the network identification of the PLMN of the visited place transmitted by a cell site matches with any one of the network identification in the EPLMN list, the mobile communication terminal may initiate a network registration and establish a communication connection with the PLMN of the visited place.

Figure 5:
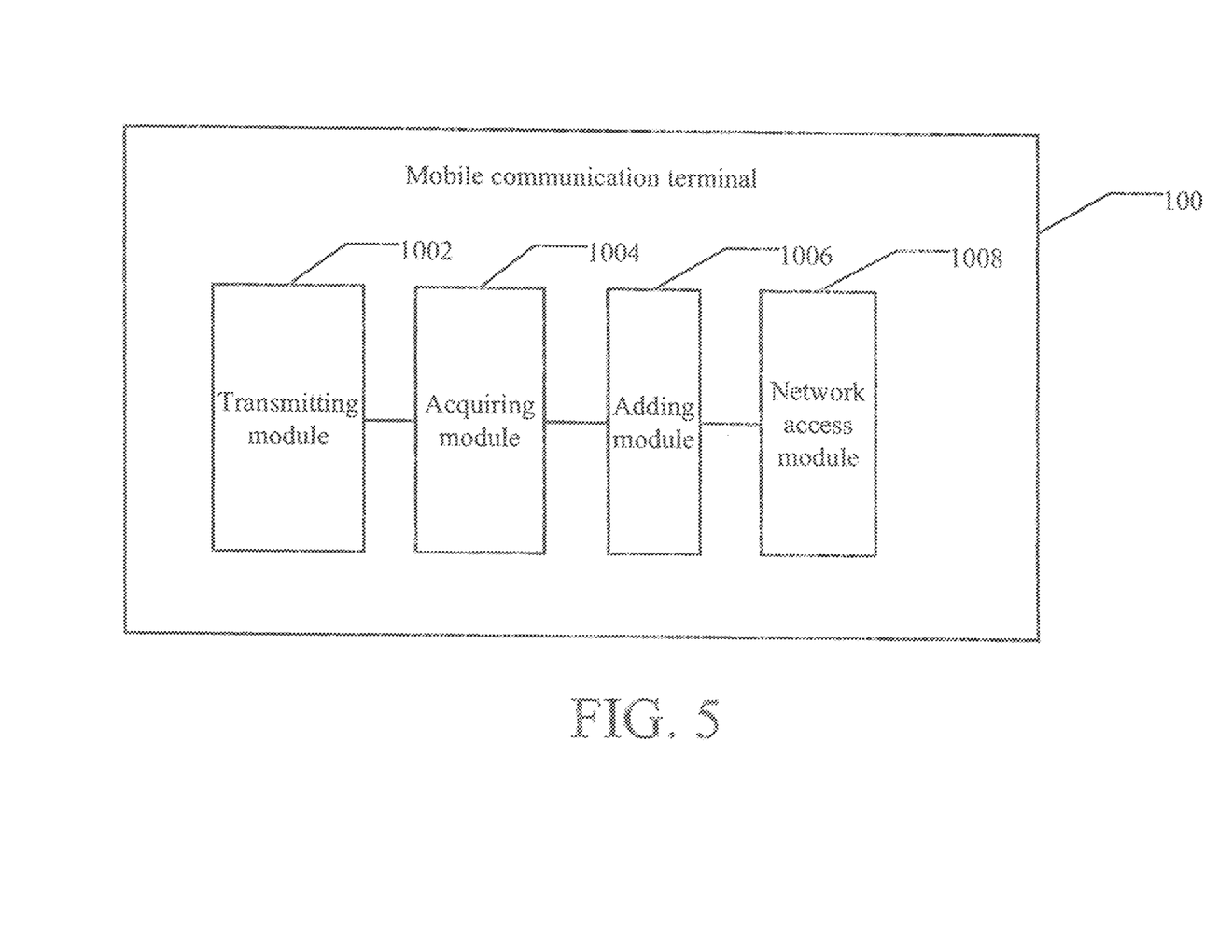
FIG. 5 is an illustrative block diagram of an implementation manner of a mobile communication terminal provided by an embodiment of the present disclosure.

Please refer to FIG. 5, which is an illustrative block diagram of an implementation manner of a mobile communication terminal provided by an embodiment of the present disclosure. As shown in FIG. 5, the mobile communication terminal 100 includes a transmitting module 1002, an acquiring module 1004, an adding module 1006, and a network access module 1008.

The transmitting module 1002 is configured to transmit a request for acquiring shared network information to a shared server if the mobile communication terminal detects that a network identification of a PLMN of a visited place does not exist in a local memory of the mobile communication terminal. The network identification of the PLMN of the visited place is a network identification of an operator of the visited place, which signs a roaming agreement with an operator of the home place to which a SIM card attached to the mobile communication terminal belongs. The network identification includes a network number. The shared network information includes a network identification of the PLMN of the visited place which a second terminal pushes to the shared server.

The acquiring module 1004 is configured to receive the shared network information which the shared server transmits in response to the request and acquire the network identification of the PLMN of the visited place from the shared network information. The acquiring module 1004 may include a first receiving unit or a second receiving unit. The first receiving unit is configured to receive all of the shared network information which the shared server transmits. The second receiving unit is configured to receive the shared network information with respect to the visited place which the shared server transmits.

The adding module 1006 is configured to add the network identification of the PLMN of the visited place acquired by the acquiring module 1004 to an EPLMN list. The EPLMN list includes the network identification of a PLMN of a home place and the network identification of the PLMN of the visited place.

The network access module 1008 is configured to access a network according to the EPLMN list.

Figure 6:
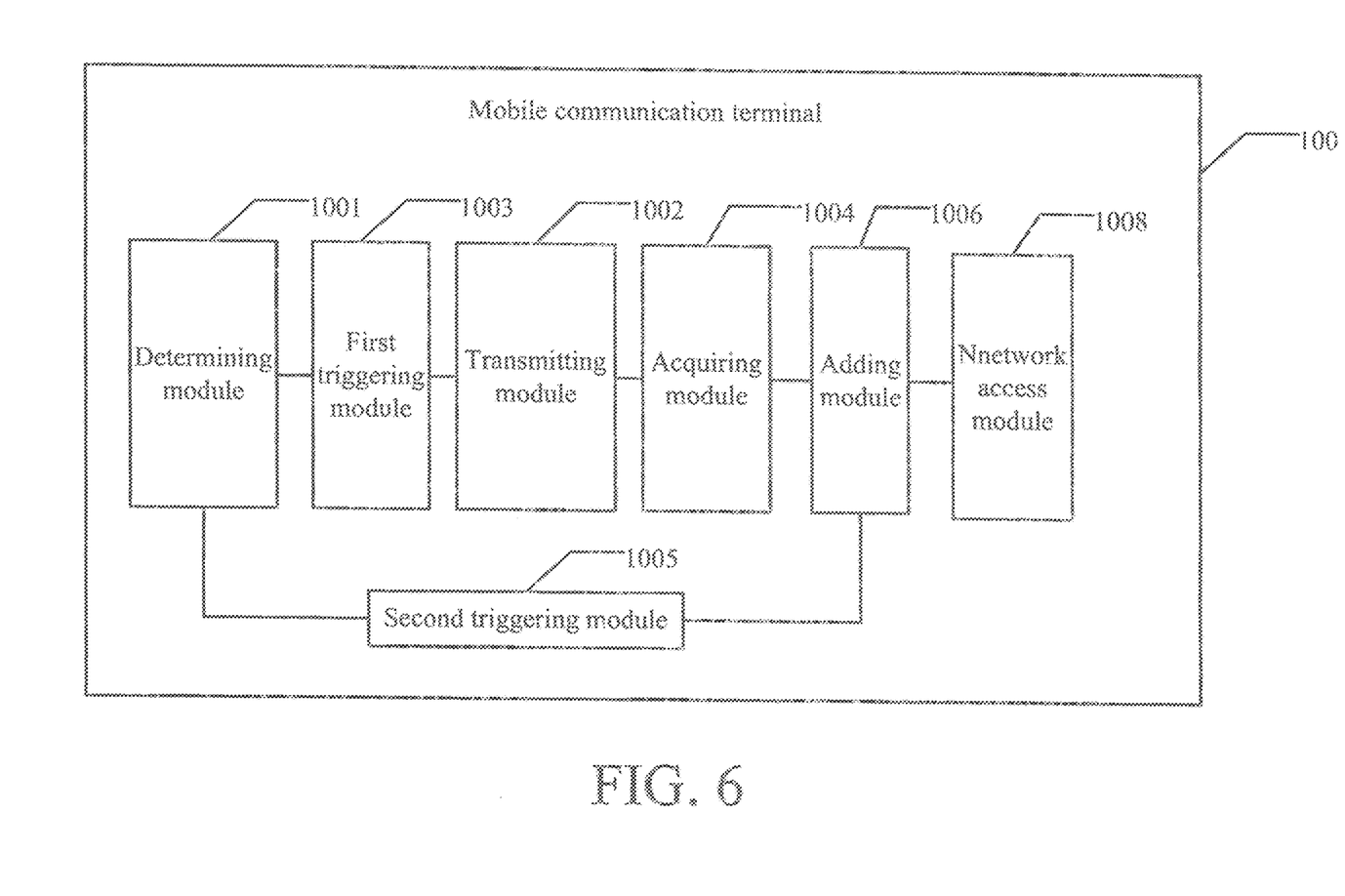
FIG. 6 is an illustrative block diagram of another implementation manner of a mobile communication terminal provided by an embodiment of the present disclosure.

Please refer to FIG. 6, which is an illustrative block diagram of another implementation manner of a mobile communication terminal provided by an embodiment of the present disclosure. As shown in FIG. 6, the mobile communication terminal 100 may include a transmitting module 1002, an acquiring module 1004, an adding module 1006, and a network access module 1008 and further include a determining module 1001, a first triggering module 1003, and a second triggering module 1005.

The transmitting module 1002 is configured to determine whether a network identification of a PLMN of a visited place exists in a memory of the mobile communication terminal before transmitting a request for acquiring shared network information to a shared server.

The first triggering module 1003 is configured to trigger the transmitting module 1002 to perform transmitting the request for acquiring the shared network information to the shared server, if a determined result of the determining module 1001 is no.

The second triggering module 1005 is configured to trigger the adding module 1006 to perform adding the network identification of the PLMN of the visited place to an EPLMN list, if the determined result of the determining module 1001 is yes.

Figure 7:
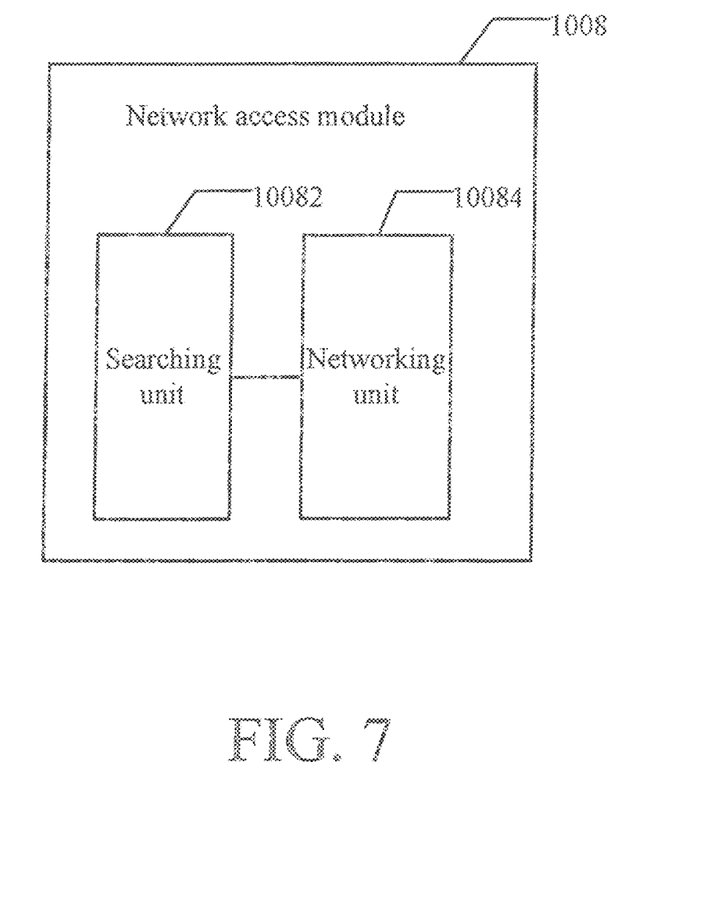
FIG. 7 is an illustrative block diagram of an implementation manner of a network access module provided by an embodiment of the present disclosure.

Please refer to FIG. 7, which is an illustrative block diagram of an implementation manner of the network access module provided by an embodiment of the present disclosure. As shown in FIG. 7, the network access module 1008 may include a searching unit 10082 and a networking unit 10084.

The searching unit 10082 is configured to search a network in the visited place.

The networking unit 10084 is configured to establish, if the PLMN of the visited place matching with the network identification in the EPLMN list is searched in the visited place by the searching unit 10082, a communication connection between the mobile communication terminal and the matching PLMN of the visited place.

Figure 8:
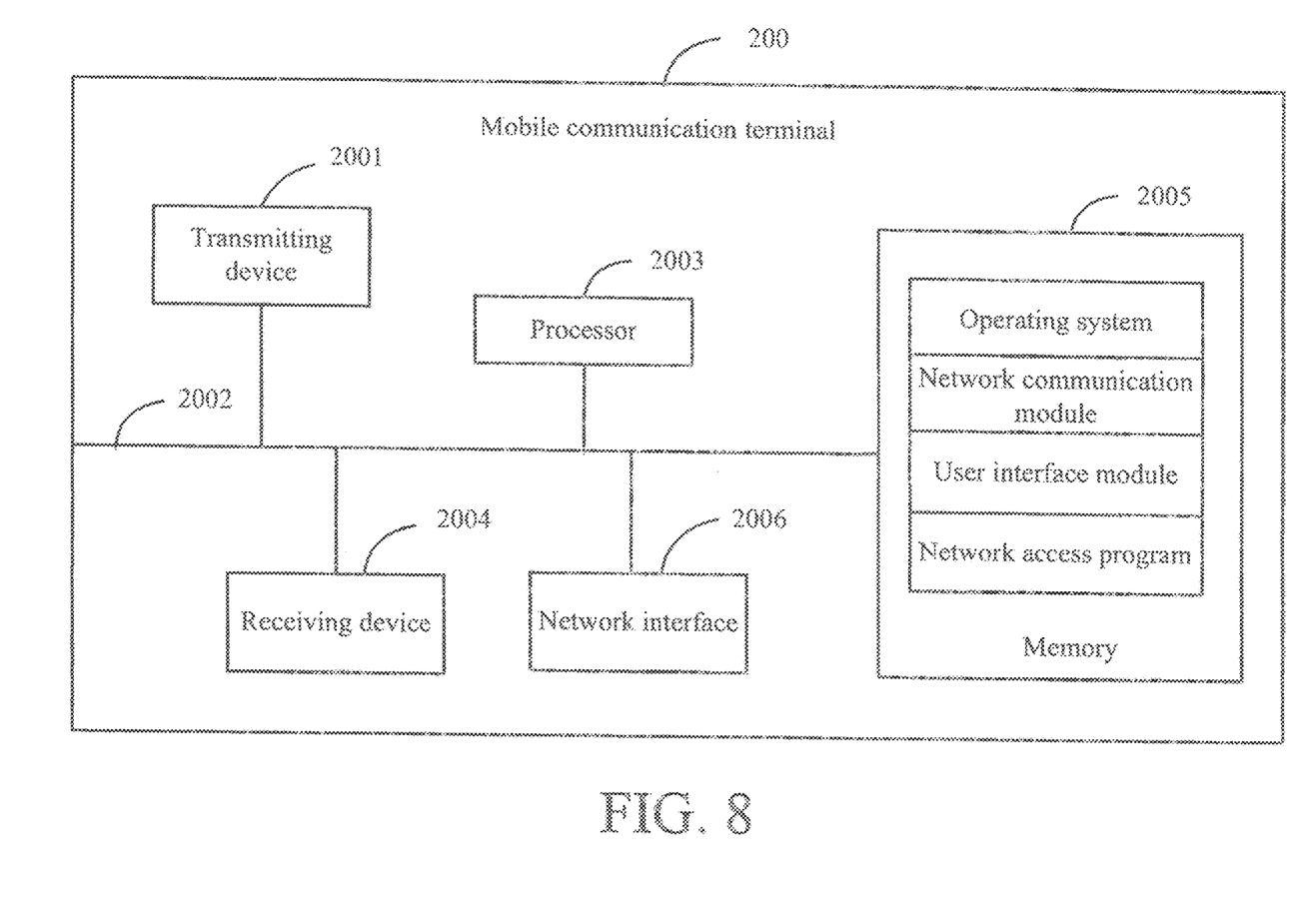
FIG. 8 is an illustrative block diagram of yet another implementation manner of a mobile communication terminal provided by an embodiment of the present disclosure.

Further, please refer to FIG. 8. FIG. 8 is an illustrative block diagram of yet another implementation manner of a mobile communication terminal provided by an embodiment of the present disclosure. As shown in FIG. 8, the mobile communication terminal 200 may include a transmitting device 2001, at least one communication bus 2002, at least one processor 2003 (e.g., at least one CPU), a receiving device 2004, a memory 2005, and at least one network interface 2006. The communication bus 2002 is configured to implement connections and communications among these components. The network interface may optionally include a standard wireless interface, e.g., a WIFI interface, a BLUETOOTH interface, or an infrared interface. The memory 2005 may be a high-speed RAM or may be a non-volatile memory, e.g., at least one magnetic disk memory. Optionally, the memory 2005 may be a storing system away from the above-mentioned processor 2003. The memory 2005 serving as a computer storage medium may include an operating system, a network communication module, a user interface module, and a network access program.

In the mobile communication terminal 200 in FIG. 8, the network interface 2006 is mainly configured to connect to a shared server and perform data communication with the shared server. The processor 2003 may be configured to call the network access program stored in the memory 2005 and perform the following operations.

If it is detected that a network identification of a PLMN of a visited place does not exist in a local memory of the mobile communication terminal, a request for acquiring shared network information is transmitted to the shared server. The network identification of the PLMN of the visited place is a network identification of an operator of the visited place, which signs a roaming agreement with an operator of a home place to which a SIM card attached to the mobile communication terminal belongs.

The shared network information which the shared server transmits in response to the request is received, and the network identification of the PLMN of the visited place is acquired from the shared network information.

The network identification of the PLMN of the visited place is added to an EPLMN list. The EPLMN list includes the network identification of the PLMN of the home place and the network identification of the PLMN of the visited place.

A network is accessed according to the EPLMN list.

Further, before transmitting the request for acquiring the shared network information to the shared server if the mobile communication terminal detects that a network identification of the PLMN of the visited place does not exist in the local memory of the mobile communication terminal, the following operations are performed.

It is determined whether the network identification of the PLMN of the visited place exists in the memory of the mobile communication terminal.

If a determined result is no, a step of transmitting the request for acquiring the shared network information to the shared server is triggered to be performed.

If the determined result is yes, a step of adding the network identification of the PLMN of the visited place to the EPLMN list is triggered to be performed.

Further, the receiving the shared network information which the shared server transmits in response to the request includes:

Receiving all of the shared network information which the shared server transmits; or Receiving the shared network information with respect to the visited place which the shared server transmits.

Further, the accessing the network according to the EPLMN list includes:

Searching the network in the visited place by the mobile communication terminal which is moved to the visited place; and Establishing a communication connection between the mobile communication terminal and a PLMN of the visited place, if the PLMN of the visited place matching with a network identification in the EPLMN list is searched in the visited place.

Further, the network identification of the PLMN of the visited place is equivalent to a network identification of a registered PLMN which the mobile communication terminal searches firstly.

Further, the visited place and the home place belong to different countries or different administrative regions.

It can be understood that the embodiments of FIG. 5 to FIG. 8 may be referred to the embodiments of the network access method of FIG. 1 to FIG. 4 and not repeated herein.

In summary, a network access method and a mobile communication terminal are provided by implementing the embodiments of the present disclosure. Not only a network identification of a home PLMN of the mobile communication terminal but also an acquired network identification of a PLMN of an operator, which signs a roaming agreement with an operator of the home PLMN, is added to the EPLMN list. The PLMNs in the ELPMN list in which the network identifications are stored are regarded to be equivalent. As a result, a network of the mobile communication terminal can be accessed according to the EPLMN list because the network identifications of the PLMNs of operators of the visited places, which sign a roaming agreement with the operator of the home PLMN, are stored in the EPLMN list. Accordingly, when the mobile communication terminal is moved from a home place to a visited place and performs a network searching, possibility of matching with any one of the PLMNs in the EPLMN list storing the network identifications is significantly increased during the network searching. A success rate and speed can be increased when the mobile communication terminal is accessed to the network of the visited place. This is beneficial to shorten a user's waiting time significantly (in an ideal state, the mobile communication terminal may be accessed to the network within several seconds), thereby enhancing the user's communication experiences.

It should be noted that those skilled in the art may understand all or some of the processes in the methods of the embodiments described above can be realized by using computer programs to instruct corresponding hardware. The programs may be stored in a computer readable storage medium. When the programs are executed, the processes in the methods of the above embodiments may be performed. The storage medium may be disk, compact disc (CD), read-only memory (ROM), random access memory (RAM) or the like.

The above description is merely the specific embodiments of the present disclosure, but the protection scope of the present disclosure is not limited thereto, any skilled who is familiar with this art could readily conceive variations or substitutions within the disclosed technical scope disclosed by the present disclosure, and these variations or substitutions shall be encompassed in the protection scope of the present disclosure. Thus, the protection scope of the present disclosure shall be subjected to the protection scope of the claims.

What is claimed is:

1. A network access method, comprising:
 transmitting, before a mobile communication terminal reaches a visited place, a request for acquiring shared network information to a shared server in response to the mobile communication terminal detecting that a network identification of a public land mobile network (PLMN) of the visited place does not exist in a local memory of the mobile communication terminal, the local memory being different from a subscriber identity module (SIM) card of the mobile communication terminal, wherein the network identification of the PLMN of the visited place is a network identification of an operator of the visited place, which signs a roaming agreement with an operator of a home place to which a subscriber identity module attached to the mobile communication terminal belongs, and the shared network information comprises the network identification of the PLMN of the visited place pushed to the shared server;

receiving, before the mobile communication terminal reaches the visited place, the shared network information which the shared server transmits in response to the request, and acquiring the network identification of the PLMN of the visited place from the shared network information;

adding, before the mobile communication terminal reaches the visited place, the network identification of the PLMN of the visited place to an equivalent PLMN (EPLMN) list by the mobile communication terminal, wherein the EPLMN list is stored in the mobile communication terminal and comprises a network identification of a PLMN of the home place and the network identification of the PLMN of the visited place; and accessing a network according to the EPLMN list;

wherein before transmitting the request for acquiring the shared network information to the shared server in response to the mobile communication terminal detecting that the network identification of the PLMN of the visited place does not exist in the local memory of the mobile communication terminal, the method further comprising:

determining, before the mobile communication terminal reaches the visited place, whether the network identification of the PLMN of the visited place exists in the local memory of the mobile communication terminal;

triggering, before the mobile communication terminal reaches the visited place, to perform a step of transmitting the request for acquiring the shared network information to the shared server, if a determined result is no; and triggering, before the mobile communication terminal reaches the visited place, to perform a step of adding the network identification of the PLMN of the visited place to the EPLMN list, if the determined result is yes.

2. The method of claim 1, wherein the receiving the shared network information which the shared server transmits in response to the request comprises:

receiving all of the shared network information which the shared server transmits; or receiving the shared network information with respect to the visited place which the shared server transmits.

3. The method of claim 1, wherein the accessing the network according to the EPLMN list comprises:

searching the network in the visited place by the mobile communication terminal which is moved to the visited place; and establishing, in response to searching the PLMN of the visited place matching with the network identification in the EPLMN list, a communication connection between the mobile communication terminal and the matching PLMN of the visited place.

4. The method of claim 1, wherein the network identification of the PLMN of the visited place is equivalent to a network identification of a registered PLMN which the mobile communication terminal searches firstly.

5. The method of claim 1, wherein the visited place and the home place belong to different countries or different administrative regions.

6. A mobile communication terminal, comprising:

a memory configured to store computer readable program codes; and a processor configured to execute the computer readable program codes to perform the following operations:

transmitting, before the mobile communication terminal reaches a visited place, a request for acquiring shared network information to a shared server in response to the mobile communication terminal detecting that a network identification of a public land mobile network (PLMN) of the visited place does not exist in a local memory of the mobile communication terminal, the local memory being different from a subscriber identity module (SIM) card of the mobile communication terminal, wherein the network identification of the PLMN of the visited place is a network identification of an operator of the visited place, which signs a roaming agreement with an operator of a home place to which a subscriber identity module attached to the mobile communication terminal belongs, and the shared network information comprises the network identification of the PLMN of the visited place pushed to the shared server;

receiving, before the mobile communication terminal reaches the visited place, the shared network information which the shared server transmits in response to the request, and acquiring the network identification of the PLMN of the visited place from the shared network information;

adding, before the mobile communication terminal reaches the visited place, the network identification of the PLMN of the visited place to an equivalent PLMN (EPLMN) list by the mobile communication terminal, wherein the EPLMN list is stored in the mobile communication terminal and comprises a network identification of a PLMN of the home place and the network identification of the PLMN of the visited place; and accessing a network according to the EPLMN list;

wherein the computer readable program codes are further executed for:

determining, before the mobile communication terminal reaches the visited place, whether the network identification of the PLMN of the visited place exists in the local memory of the mobile communication terminal, before transmitting the request for acquiring the shared network information to the shared server;

triggering, before the mobile communication terminal reaches the visited place, to perform a step of transmitting the request for acquiring the shared network information to the shared server, if a determined result is no; and triggering, before the mobile communication terminal reaches the visited place, to perform a step of adding the network identification of the PLMN of the visited place to the EPLMN list, if the determined result is yes.

7. The mobile communication terminal of claim 6, wherein the receiving the shared network information which the shared server transmits in response to the request comprises:

receiving all of the shared network information which the shared server transmits; or receiving the shared network information with respect to the visited place which the shared server transmits.

8. The mobile communication terminal of claim 6, wherein the accessing the network according to the EPLMN list comprises:
   searching the network in the visited place by the mobile communication terminal which is moved to the visited place; and
   establishing, in response to searching the PLMN of the visited place matching with the network identification in the EPLMN list, a communication connection between the mobile communication terminal and the matching PLMN of the visited place.

9. The mobile communication terminal of claim 6, wherein the network identification of the PLMN of the visited place is equivalent to a network identification of a registered PLMN which the mobile communication terminal searches firstly.

10. The mobile communication terminal of claim 6, wherein the visited place and the home place belong to different countries or different administrative regions.

11. A non-transitory computer readable storage medium, stored with computer readable program codes, the computer readable program codes being operated in a mobile communication terminal for:
   transmitting, before the mobile communication terminal reaches a visited place, a request for acquiring shared network information to a shared server in response to the mobile communication terminal detecting that a network identification of a public land mobile network (PLMN) of the visited place does not exist in a local memory of the mobile communication terminal, the local memory being different from a subscriber identity module (SIM) card of the mobile communication terminal, wherein the network identification of the PLMN of the visited place is a network identification of an operator of the visited place, which signs a roaming agreement with an operator of a home place to which a subscriber identity module attached to the mobile communication terminal belongs, and the shared network information comprises the network identification of the PLMN of the visited place pushed to the shared server;
   receiving, before the mobile communication terminal reaches the visited place, the shared network information which the shared server transmits in response to the request, and acquiring the network identification of the PLMN of the visited place from the shared network information;
   adding, before the mobile communication terminal reaches the visited place, the network identification of the PLMN of the visited place to an equivalent PLMN (EPLMN) list by the mobile communication terminal, wherein the EPLMN list is stored in the mobile communication terminal and comprises a network identification of a PLMN of the home place and the network identification of the PLMN of the visited place; and
   accessing a network according to the EPLMN list,
   wherein the computer readable program codes are further executed for:
   determining, before the mobile communication terminal reaches the visited place, whether the network identification of the PLMN of the visited place exists in the local memory of the mobile communication terminal, before transmitting the request for acquiring the shared network information to the shared server;
   triggering, before the mobile communication terminal reaches the visited place, to perform a step of transmitting the request for acquiring the shared network information to the shared server, if a determined result is no; and
   triggering, before the mobile communication terminal reaches the visited place, to perform a step of adding the network identification of the PLMN of the visited place to the EPLMN list, if the determined result is yes.

12. The non-transitory computer readable storage medium of claim 11, wherein the receiving the shared network information which the shared server transmits in response to the request comprises:
   receiving all of the shared network information which the shared server transmits; or
   receiving the shared network information with respect to the visited place which the shared server transmits.

13. The non-transitory computer readable storage medium of claim 11, wherein the accessing the network according to the EPLMN list comprises:
   searching the network in the visited place by the mobile communication terminal which is moved to the visited place; and
   establishing, in response to searching the PLMN of the visited place matching with the network identification in the EPLMN list, a communication connection between the mobile communication terminal and the matching PLMN of the visited place.

14. The non-transitory computer readable storage medium of claim 11, wherein the network identification of the PLMN of the visited place is equivalent to a network identification of a registered PLMN which the mobile communication terminal searches firstly.

15. The non-transitory computer readable storage medium of claim 11, wherein the visited place and the home place belong to different countries or different administrative regions.

* * * * *